United States Patent

[11] 3,627,173

[72] Inventor Reinhard Kerker
 Meerwiese 784, Brake, Germany
[21] Appl. No. 14,565
[22] Filed Feb. 26, 1970
[45] Patented Dec. 14, 1971

[54] HORTICULTURAL APPLIANCE FOR DISPENSING SEEDS ONTO SEED BEDS
 20 Claims, 6 Drawing Figs.

[52] U.S. Cl. .................................................. 221/211,
 111/1
[51] Int. Cl. ..................................................... A01c 5/00
[50] Field of Search ........................................... 221/185,
 211, 312; 222/74, 335; 111/1, 92–95

[56] References Cited
 UNITED STATES PATENTS

| | | | |
|---|---|---|---|
| 3,261,208 | 7/1966 | Fisher............................ | 73/425.6 |
| 2,546,838 | 3/1951 | Tasche........................... | 221/211 X |
| 2,605,017 | 7/1952 | Bolen............................ | 221/211 X |
| 2,704,685 | 3/1955 | Tyler............................ | 111/1 X |

Primary Examiner—Robert B. Reeves
Assistant Examiner—Thomas E. Kocovsky
Attorney—Michael S. Striker ABSTRACT: A frame is positionable over a surface area on which seeds are to be individually deposited at predetermined spacing. A plurality of elongated hoses are carried by the frame and have respective upper open ends located in a common plane and lower open ends which are also located in a common plane and which are positioned at the aforementioned predetermined spacing. A pickup element has a hollow interior and includes a plurality of nozzles communicating with the hollow interior and each dimensioned to pick up a single seed. Mounting means mounts the pickup element for movement between two positions in one of which the nozzles communicate with a supply of seeds and in the other of which each of the nozzles registers with one of the upper open ends. Actuating means is operable for applying suction to the hollow interior when the element is in its one position, and for applying pressure to the hollow interior when the element is in its other position, to thereby respectively engage individual seeds with and discharge them into the upper open ends from the nozzles.

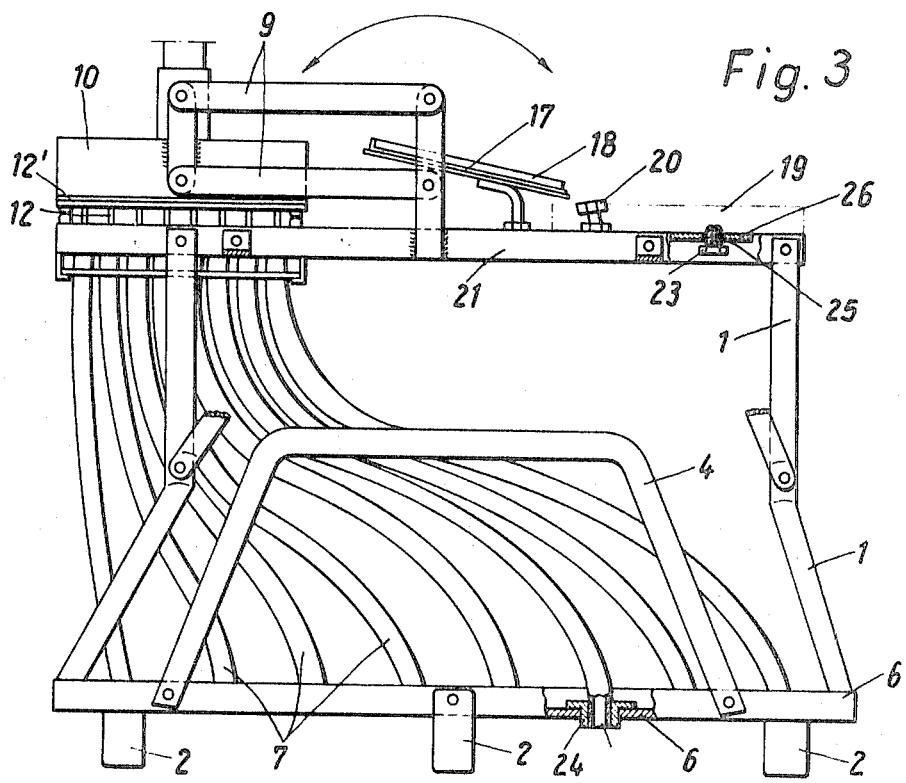
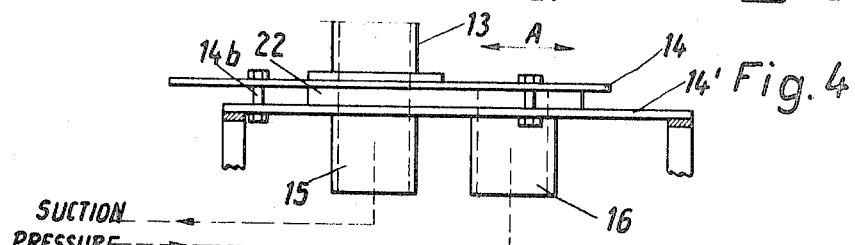
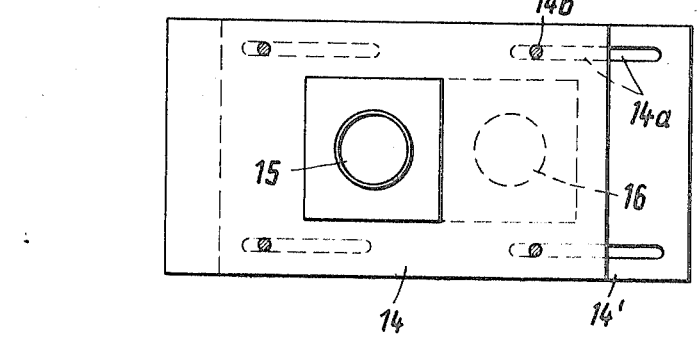

HORTICULTURAL APPLIANCE FOR DISPENSING SEEDS ONTO SEED BEDS

BACKGROUND OF THE INVENTION

The present invention relates generally to horticultural appliances, and more particularly to a horticultural appliance for individually positioning seeds at predetermined spacing from one another into seed flats, pots or the like.

Appliances of this general type are already known. They operate pneumatically and comprise a plate which is hollow and whose interior is connectable with a source of suction. The plate is provided with a plurality of openings in a surface thereof and these openings communicate with the interior of the plate. Seed is poured or otherwise deposited on the aforementioned surface and, with the interior of the plate connected with the source of suction, the plate is moved to assure that each of the bores retains a seed which is pulled against the bore—but not through it because the bore is too small—by the internal suction. The excess seeds are now poured off and the plate positioned with its aforementioned surface closely above a seed flat or whatever other surface on which the seeds are to be deposited, whereupon the source of suction is disconnected so that the individual seeds can drop onto the surface where they are to be planted.

This known prior art construction has several disadvantages, among the most important of which is the fact that the necessarily close positioning of the bores or openings in the hollow suction plate above the soil into which the seeds are to be planted before the suction can be disconnected, brings with it the danger that the bores or openings be partially or completely clogged by contact with the soil and make the device inoperative. A further disadvantage is the fact that a relatively large quantity of seeds must always be on hand to make it possible to pour an adequate supply of seeds onto the apertured surface of the suction plate in order to assure that each of the bores will retain a seed. Finally there are the additional disadvantages that the plate must have at least the size of the surface area onto which the individual seeds are to be deposited, and that only round or substantially round seeds can be planted in this manner whereas the device is not suitable for elliptical seeds.

SUMMARY OF THE INVENTION

It is, accordingly, an object of the present invention to avoid the aforementioned disadvantages.

A more particular object of the invention is to provide a horticultural appliance of the general type under discussion which is not possessed of these disadvantages.

A concomitant object of the invention is to provide such an appliance which requires for only a comparatively small quantity of seeds to be kept on hand and can operate without having large quantities of seed poured onto its apertured surface provided with the suction bores or nozzles.

Still a further object of the invention is to provide such an appliance which will reliably engage and retain only a single seed with each nozzle, rather than being possessed of the danger that more than one such seed be engaged.

Still a further object of the invention is to provide such an appliance which is relatively simple in its construction and requires for its operation no particular skill.

In pursuance of the above objects, and others which will become apparent hereafter, one feature of my invention resides in a horticultural appliance which, briefly stated, comprises frame means positionable over a surface area on which seeds are to be individually deposited at predetermined spacing. A plurality of elongated conduits are carried by the frame means and have respective upper open ends located in a common first plane, and lower open ends located in a common second plane and positioned at the aforementioned predetermined spacing. A pickup element has a hollow interior and includes a plurality of nozzles which communicate with the hollow interior and which are each dimensioned to pick up a single seed. Mounting means mounts the pickup element for movement between two positions in one of which the nozzle communicates with a supply of seeds and in the other of which each of the nozzles registers with one of the upper open ends. Finally, actuating means is provided and operable for supplying suction to the hollow interior when the element is in the aforementioned one position, and for applying pressure to the hollow interior when the element is in the aforementioned other position to thereby respectively engage individual seeds with and discharge them into the aforementioned upper open ends from the nozzle.

With this construction the conduits can be so arranged that their lower open ends are spaced in the manner and at the distances (and/or patterns) desired whereas the upper open ends can be located much closer together so that accordingly the suction nozzles cooperating with these upper open ends can also be located very closely adjacent one another. The result is a very compact construction and, because the suction nozzles can be located very closely adjacent one another, the seed supply can be accommodated in a relatively small container into which the suction nozzles enter as will be described later to pick up the seeds, so that only a comparatively small quantity of the seeds need be accommodated in the container at any one time. This means that it is not necessary to have large quantities of seeds on hand which are poured liberally over the apertured surface of the suction plate as in the prior art construction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a side-elevational view of the embodiment in FIG. 1;

FIG. 4 is a somewhat diagrammatic side-elevational detail view of the actuating means for the appliance illustrated in the preceding Figures;

FIG. 5 is a top-plan view of FIG. 4; and

FIG. 6 is a longitudinal section, on an enlarged scale, through a suction nozzle for the illustrated and disclosed appliance.

DESCRIPTION OF THE PREFERRED EMBODIMENTS

Figure 1:
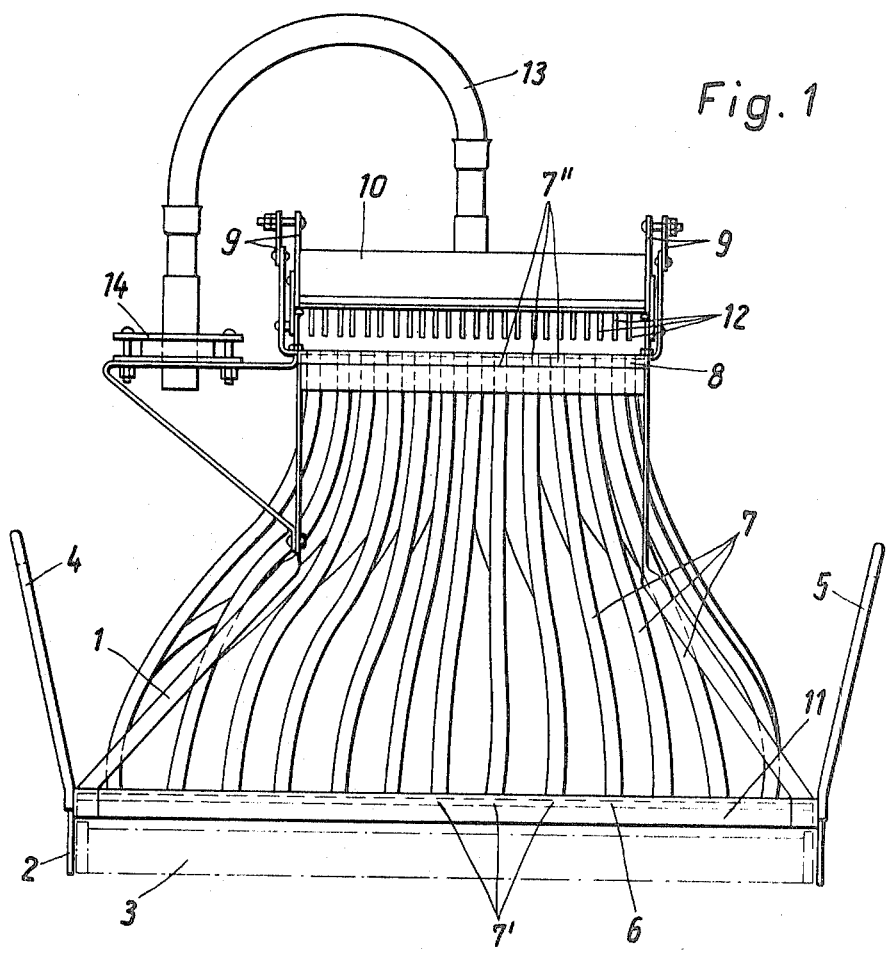
FIG. 1 is a somewhat diagrammatic front-elevational view of an appliance in accordance with my invention.
Figure 2:
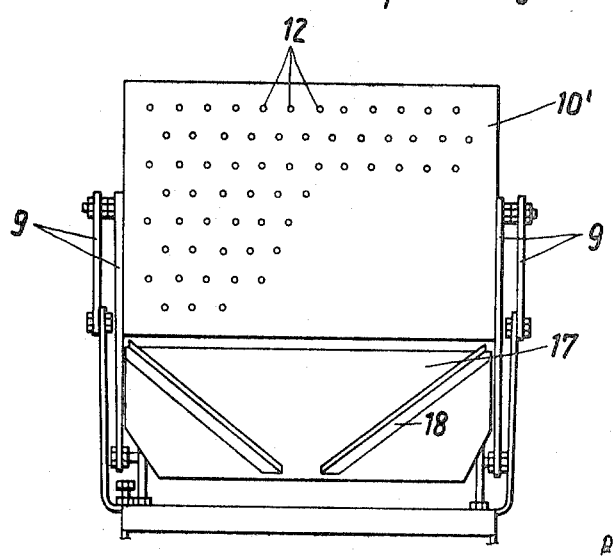
FIG. 2 is a bottom-plan view of the pickup element of the appliance in FIG. 1.

Discussing now the drawing in detail it will be seen that my novel horticultural appliance comprises in the illustrated embodiment a frame 1 including a lower plate 6 and an upper plate 8. It is preferable but not absolutely necessary that the plates 6 and 8 be of transparent material, for instance a suitable synthetic plastic. The frame 1 further comprises legs or supports 2 projecting downward below the plate 6 with which it can rest on a support surface. It is advantageous that the supports 2 be removable so that they can be replaced by others which are either longer or shorter, thereby making it possible to position the underside of the plate 6 at a spacing from the support surface which is greater or lesser. For instance, if the novel appliance is used to deposit seeds in a seed flat, then the exchange of supports 2 for others makes it possible to use seed flats which are higher or lower, as the case may be. One such seed flat is illustrated in its seeding position in FIG. 1 in diagrammatic broken line form. There are further provided two handles 4, 5 which need of course not be of the illustrated type (see FIG. 1) which facilitate transportation of the rather small and lightweight appliance.

The plate 6 is mounted on and carried by the lower portion 11 of the frame 1 and is provided with a plurality of apertures or bores, holes or the like which are spaced from one another at distances and in a pattern corresponding to the distances and pattern at which the seeds are desired to be deposited on a surface, such as in a seed flat 3. A plurality of conduits, preferably hoses of transparent material, is identified with reference numeral 7 and these each have lower ends 7' and upper ends 7". The lower end 7' of each of the conduits 7 is received in one of the openings of the plate 6. It is advantageous although not necessary that a retaining member of the type illustrated in FIG. 3 and identified with reference numeral 24 be received in the respective holes of the plate 6, and that each such retaining member 24 holds the lower end portion 7' of the respective conduit 7, to assure that the lower end portion 7' extends normal to the general plane of the plate 6, which plane of course is at least generally parallel with the surface on which seeds are to be deposited. Of course, the retaining members 24 could also be differently configured and their particular configuration is not to be considered limiting in any sense.

Although, as just pointed out, the spacing between the lower ends 7' of the conduits 7 corresponds to the spacing and pattern at which it is desired to deposit the seeds on a surface, this is not necessary for the upper ends 7" of the conduits 7. Instead, these upper ends 7" can be located closely together, as is suggested by the manner in which the conduits 7 are shown converging in upwards direction (see FIGS. 1 and 3). The upper plate 8 advantageously also consists of transparent material and is provided with a plurality of openings corresponding to the number of upper open ends 7" and each receiving one of these upper open ends. However, as already pointed out, the openings in the plate 8 are very close together by contrast to those in the plate 6. The upper open ends 7" are all located in a common plane, and those in the plate 6 are similarly located in a common plane, with the two planes extending in at least substantial parallelism with one another.

A pair of transversely spaced parallel linkages 9 is provided (see FIG. 1) between which is mounted a hollow pickup element of generally box-shaped configuration and identified with reference numeral 10. This pickup element 10 is connected to the linkages 9 and its normally downward directed side is provided with a plurality of openings communicating with the interior of the element 10 and provided with nozzles 12 of generally tubular configuration. It is advantageous that these nozzles 12 be removable so that they can be replaced with others of different inner diameter, of differing length or of generally different characteristics as may be desired. In any case, the openings and the tubular nozzles 12 associated therewith correspond in their relative spacing and arrangement to the spacing and arrangement of the upper open ends 7" of the conduits 7. If the element 10 is in the position shown in FIG. 3, then the lower free ends of the tubular nozzles 12 extend into respective ones of the upper open ends 7" of the conduits 7.

If for any reason it is found difficult to properly guide the conduits 7 so that their upper open ends are exactly vertical as desired, it is possible to provide two of the plates 8 which are vertically spaced from one another and which are both provided with identically arranged bores so that the upper open ends are held by the two plates 8 at longitudinally spaced positions (with reference to the length of the conduits 7) and are thus prevented from shifting in their positions. The use of dual plates 8 is not illustrated but it is thought that the possibility is clearly enough described to make it readily understandable to those having skill in the art.

A further possibility is to mount the tubular nozzles 12 on a supporting plate 12' which they penetrate and which, in turn, is connectable with the element 10. In this case the entire plate 12' with the associated nozzles 12 is removed and replaced with a front plate on which nozzles 12 are provided which are either spaced and arranged in a different pattern, are of larger or smaller inner cross-sectional diameter, or have other desired characteristics. This is a particularly rapid way of accommodating the appliance for instance to the use of differently dimensioned or configured seeds.

The element 10 is connected via a flexible conduit—such as a hose or the like—with an actuating device which is illustrated in FIGS. 4 and 5. This device comprises a first portion 14 provided with downward projecting pins 14b which extend through elongated slots 14a provided in a second portion 14' located below the portion 14b. The portion 14' is provided with a pair of openings with which conduits 15 and 16 respectively communicate and are secured. One of these conduits, in FIG. 4 the conduit 15, communicates or can be made to communicate with a source of suction, and the other conduit such as in the drawing the conduit 16 communicates or can be made to communicate with a source of pressure. Suction and pressure are identified with legends in FIG. 4 and it is pointed out that any suitable source can be provided, such as a vacuum cleaner or analogous device. For instance, the suction and pressure side of the vacuum cleaner can be connected by means of suitable hoses with the conduits 15 and 16 respectively. However, it is clear that other sources of suction and pressure can also be provided if desired. In any case, the portion 14 is shiftable in the direction of the double-headed arrow A (see FIG. 4) with reference to the portion 14', and because the hose 13 is fast with the portion 14 it also moves with reference to the portion 14', and thus with reference to the conduits 15 and 16. Reference numeral 22 identifies a seal which assures that, when the hose 13 communicates with the open ends of the conduits 15 or 16, respectively, a seal is established between the respective conduit and the hose 13. Thus, if the hose 13 communicates with the conduit 15, the hose and thereby the interior of the element 10 will be connected with suction, whereas in the case of communication with the conduit 16 the hose 13 and the interior of the element 10 will be connected to pressure. It should be emphasized in this connection that the device illustrated in FIGS. 4 and 5 could of course also be differently constructed, so that for instance the arrangement of the pins 14b and slots 14a could be reversed, or the member 14' be shiftable and the member 14 be stationary. This would not change the concept of the present invention.

Mounted on an upper portion 21 of the frame 1 is a chute 17 whose upper surface is provided with guide ribs 18 and inclined in such a manner that the lowermost edge of the upper surface communicates with the interior of a container 19 which is also mounted on the portion 21 of the frame 1 and which contains seeds to be picked up and planted by the novel appliance. An adjustable abutment screw 20 provided on the frame portion 21 prevents the free ends of the tubular nozzles 12 from abutting against the inside of the bottom wall of the container 19 when the element 10 is swung by means of the joindered parallel linkages 9 in the direction of the double-headed arrow in FIG. 3 so that the free ends of the tubular nozzles 12 communicate with the interior of the container 19. Evidently, such abutment would bring with it the danger either of damage to the seeds or to the nozzles 12.

The underside of the seed container 19 is provided with suitable guide means, for instance the illustrated screws or bolts 23 which engage in a slot 25 of two guide rails 26 mounted on the frame 1 so as to permit limited transverse displacement of the container 19 with reference to the direction of movement of the element 10. In FIG. 3 the direction of movement of the element 10 is identified by the double-headed arrow in the plane of the drawing, and movement of the container 19, which is diagrammatically illustrated only, would take place in the direction normal to the plane of FIG. 3. The purpose of such movement is to permit limited lateral shaking movement for the container 19 if this is desired or necessary to facilitate engagement of the seeds by the nozzles 12 without, however, damaging either the seeds or the nozzles.

One such nozzle 12, particularly adapted for the pickup of generally elliptical seeds, such as salad seeds, is illustrated in FIG. 6. It will be seen that the nozzle 12 tapers conically inwardly as well as outwardly towards its free end where its opening 12" is provided, and the double inner and outer taper so reduces the wall thickness of the nozzle 12 that the wall does not provide an obstacle to the engagement under suction of the seeds. Of course, the dimensions of the opening 12" may differ in accordance with the particular types of seed which the nozzles 12 are intended to pick up. For instance, the opening may be 0.8 mm. diameter, it may be of 0.45 mm. diameter or it may have a different diameter as desired.

In operation of the novel appliance according to the present invention, the appliance is positioned over a surface on which seeds are to be deposited via the lower open ends 7' of the conduits 7. If it is for instance assumed that seeds are to be deposited in a seed flat 3, then this is first filled with suitable soil or other growth material such as moist peat, and then the appliance is either placed over it or the flat is pushed underneath the plate 6. In any case, the outlet ends 7' will now be located closely above the upper surface of the soil, peat or the like. Now the member 14 is displaced in a sense establishing communication between the hose 14 and the conduit 15 which is connected to a source of suction. The element 10 is pivoted in the sense indicated by the double-headed arrow in FIG. 3 until its underside from which the tubular nozzles 12 project is juxtaposed with the interior of the conduit 19, and the suction causes individual seeds to be attracted and held against the open ends of the nozzles 12. To facilitate this the container 19 may be laterally displaced or shaken, as mentioned before. Thereupon the element 10 is displaced towards the left in FIG. 3 until it is substantially halfway between the container 19 and the plate 8. Because of the construction of the linkages 9 the element 10 will at this point of its travel be upright, that is the nozzles 12 will extend in the direction in which they define substantially right angles with the position which they assume when the element 10 is in the position shown in FIG. 1. The free ends of the nozzles 12 with the seeds held thereon are now visible to an operator. Abutment of the element 10 at the rear edge of the hose connection is sufficient to cause excess attracted seeds—which are not properly held by suction by the respective nozzles 12—to fall off onto the chute 17 where they are guided by the ribs 18 into the interior of the container 19. A quick glance by the operator will now show whether all of the nozzles 12 carry a seed as desired, and thereupon the element 10 is pivoted until its lower side from which the nozzles 12 project extends in at least substantial parallelism with the plate 8, whereupon it is moved horizontally until each of the nozzles 12 registers with an upper open end 7" of the respective conduits 7. The element 10 may also be lowered so that the free ends of the nozzles 12 extend to a greater or lesser distance into the respective upper open ends 7", if desired. In any case, when the element 10 is in the aforementioned position which is shown in FIG. 1, the portion 14 is shifted until the hose 13 communicates with the conduit connected to pressure, in the illustrated embodiment the conduit 16. The interior of the element 10 is thus pressurized and the seeds are thrown off the respective nozzles 12 into the conduits 7 through which they fall to issue from the lower open ends 7' and become deposited on the surface beneath them. Furthermore, this blowing-off process has the additional advantage that the nozzles 12 are cleaned every time it takes place, so that improper operation of the device as a result of clogging of the nozzles 12 is reliably avoided.

It will be appreciated that the entire period of time from pickup to discharge and planting of the seeds takes no more than a few seconds so that the appliance according to the present invention makes possible a very high planting rate. This is true particularly because the appliance makes it possible to remove seeds vertically from the container 19, and because the latter for this reason can contain a quantity of seeds sufficient—depending upon the size of the seeds—to plant large surface areas, for instance to plant up to one hundred seed flats 3. Of course, because there is no pouring of the seeds involved as in the prior art constructions, there is no danger of seed contamination and consequent malfunction of the device as a result of the entry of contaminants from the seeds into the device.

Because of the compact and lightweight construction of the appliance according to the present invention, the appliance can be readily lifted and transported so that, if desired, the operator can readily move the appliance from seed flat to seed flat, rather than having to move the seed flats to the appliance and subsequently remove them again. The source of suction and pressure may, as pointed out before, be a vacuum cleaner or it may be a device analogous to a vacuum cleaner. If it is desired to move the appliance at will, then it is advantageous to mount the source of suction and pressure either in such a manner that the operator may carry it as a back pack, or for instance to mount it on wheels so that the operator can pull this source—which of course is connected with the device by the suction and pressure hoses—with him as he moves the device from spot to spot.

It will be understood that each of the elements described above, or two or more together, may also find a useful application in other types of constructions differing from the types described above.

While the invention has been illustrated and described as embodied in a horticultural appliance, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A horticultural appliance, comprising frame means positionable over a surface area on which seeds are to be individually deposited at predetermined spacing, and comprising a smaller upper and a downward spaced larger lower plate extending in at least substantially parallel planes; a plurality of elongated conduits carried by said frame means and having respective upper open ends connected to said upper plate and located in a common first plane closely together, and lower open ends connected to said lower plate and located in a common second plane positioned farther apart at said predetermined spacing; a pickup element having a hollow interior and including a plurality of nozzles communicating with said hollow interior and each dimensioned to pick up a single seed; mounting means mounting said pick up element for movement between two positions in one of which said nozzles communicate with a supply of seeds and in the other of which each of said nozzles registers with one of said upper open ends; and actuating means operable for applying suction to said hollow interior when said element is in said one position, and for applying pressure to said hollow interior when said element is in said other position to thereby respectively engage individual seeds with and discharge them from said nozzles into said upper open ends for movement to said lower open ends.

2. An appliance as defined in claim 1, wherein said conduits are respective hoses.

3. An appliance as defined in claim 1, said pick up element having a side which faces said upper open ends when said pick up element is in said second position thereof; and wherein said nozzles are constituted by tubular members projecting from said side and having free end portions registering with the respective upper open ends when said pick up element is in said second position.

4. An appliance as defined in claim 1, said pickup element having two lateral margins; and wherein said mounting means comprises a pair of jointed parallel linkages respectively located adjacent to and connected with said lateral margins.

5. An appliance as defined in claim 1, said lower plate having a plurality of holes therethrough and being positioned at said predetermined spacing, and wherein said conduits are flexible at least in the region of said lower ends; and at least substantially rigid guide sleeves each received in one of said holes and connected with the lower ends of one of said conduits for maintaining at least said lower ends at least substantially normal with reference to said parallel planes.

6. An appliance as defined in claim 1, said pickup element comprising a first member having said hollow interior, and a second member releasably connected with said first member and provided with said nozzles; and further comprising at least one additional second member releasably connectable with said first member in place of the first-mentioned second member and provided with a plurality of nozzles differently dimensioned than the first-mentioned nozzles.

7. An appliance as defined in claim 1, said pickup element comprising a first member having said hollow interior, and a second member releasably connected with said first member and provided with said nozzles; and further comprising at least one additional second member releasably connectable with said first member in place of the first-mentioned second member and provided with a plurality of nozzles differently spaced than the first-mentioned nozzles.

8. An appliance as defined in claim 1, said nozzles being tubular and having free ends and an inner and outer cross section which conically tapers in direction towards said free ends whereby to decrease the wall thickness of said tubular nozzles in direction towards said free ends.

9. An appliance as defined in claim 1 and further comprising handle means on said frame means for transportation of said appliance by an operator.

10. An appliance as defined in claim 1, wherein said nozzles each have a free end and an inner passage tapering in direction towards the respective free end and having at the same an opening of 0.45 mm.

11. An appliance as defined in claim 1, wherein said nozzles each have a free end and an inner passage tapering in direction towards the respective free end and having at the same an opening of 0.8 mm.

12. An appliance as defined in claim 1, said actuating means comprising a flexible conduit connected to and communicating with the interior of said pickup element and having a free end, a suction conduit and a pressure conduit, and communication-establishing means for selectively establishing communication between said free end and said suction and pressure conduits, respectively.

13. An appliance as defined in claim 12, said communication-establishing means comprising a first portion holding said suction and pressure conduits in predetermined relationship, a second portion holding said free end, one of said portions being shiftable relative to the other between two locations in which said free end communicates with said suction and pressure conduits, respectively, and a sealing portion establishing a seal between said free end and said suction and pressure conduit, respectively.

14. An appliance as defined in claim 1, and further comprising adjustable abutment means cooperating with said pickup element for permitting intrusion of the respective nozzles into the associated upper ends to an adjustable extent when said pickup element is in said other position thereof.

15. An appliance as defined in claim 14, wherein said abutment means comprises an abutment screw.

16. An appliance as defined in claim 1, wherein at least said conduits consist at least in part of transparent material.

17. An appliance as defined in claim 16, wherein said plates also consist at least in part of transparent material.

18. An appliance as defined in claim 1 further comprising an upward open container adapted to contain seeds and to constitute said supply of seeds; connecting means connecting said container with said frame means spaced from said upper open ends; and a guide member arranged intermediate said upper open ends and said container for returning to the latter such seeds as become separated from said pickup element during movement thereof from said one towards said second position.

19. An appliance as defined in claim 18, said element moving in a predetermined path between said positions thereof; and wherein said guide member comprises an upper surface beneath said path and downward inclined in direction from said upper open ends towards said container, and guide ribs provided on said upper surface and extending in said direction.

20. An appliance as defined in claim 18; further comprising cooperating guide elements provided on said frame means and said container for enabling limited freedom of movement of the latter transversely to the direction of movement of said pickup element.

* * * * *